United States Patent [19]

Meadows

[11] Patent Number: 4,806,938

[45] Date of Patent: Feb. 21, 1989

[54] INTEGRATED SELF-ADAPTIVE ARRAY REPEATER AND ELECTRONICALLY STEERED DIRECTIONAL TRANSPONDER

[75] Inventor: Lee A. Meadows, Santa Barbara, Calif.

[73] Assignee: Raytheon Company, Lexington, Mass.

[21] Appl. No.: 94,060

[22] Filed: Sep. 3, 1987

Related U.S. Application Data

[63] Continuation of Ser. No. 930,029, Nov. 10, 1986, abandoned, which is a continuation of Ser. No. 673,446, Nov. 20, 1984, abandoned.

[51] Int. Cl.$^4$ ............................................. H01Q 1/00
[52] U.S. Cl. ................................................... 342/370
[58] Field of Search ........................................ 342/370

[56] References Cited

U.S. PATENT DOCUMENTS

| | | | |
|---|---|---|---|
| 2,908,002 | 10/1959 | Van Atta | 343/370 |
| 3,142,837 | 7/1964 | Johnson | 343/370 |
| 3,150,320 | 9/1964 | Gruenberg | 343/370 |
| 3,340,530 | 9/1967 | Sullivan et al. | 343/370 |
| 3,711,855 | 1/1973 | Schmidt et al. | |
| 3,715,749 | 2/1973 | Archer | 343/5 R |
| 3,731,313 | 5/1973 | Nagai | 343/370 |
| 3,754,258 | 8/1973 | Coleman | 342/370 |
| 3,757,335 | 9/1973 | Gruenberg | 343/370 |
| 4,121,221 | 10/1978 | Meadows | 343/370 |
| 4,144,495 | 3/1979 | Metzger | |
| 4,233,606 | 11/1980 | Chernoff | 342/370 |
| 4,472,719 | 9/1984 | Hills | 343/370 |

FOREIGN PATENT DOCUMENTS 1017123 of 1966 United Kingdom .
1027008 of 1966 United Kingdom .
1403997 of 1975 United Kingdom .

*Primary Examiner*—Theodore M. Blum
*Assistant Examiner*—David Cain
*Attorney, Agent, or Firm*—Richard M. Sharkansky

[57] ABSTRACT

A radio frequency transponder/repeater is provided wherein an array of receiving antenna elements is coupled to an array of transmitting antenna elements to provide a directional antenna system and including additionally an internal radio frequency source which is also coupled to the array of transmitting antenna elements. With such arrangement, an internally generated signal provided by the radio frequency source may be transmitted using the transmitting array of the Van Atta System.

11 Claims, 2 Drawing Sheets

INTEGRATED SELF-ADAPTIVE ARRAY REPEATER AND ELECTRONICALLY STEERED DIRECTIONAL TRANSPONDER

The Government has rights in this invention pursuant to Contract No. N00024-86-C-3019 awarded by the Department of the Navy.

This application is a continuation of application Ser. No. 930,029, filed Nov. 10, 1986, which is a continuation of Ser. No. 673,446, filed Nov. 20, 1984.

BACKGROUND OF THE INVENTION

The invention relates generally to radio frequency energy systems and more particularly to radio frequency energy repeaters and transponders.

As is known in the art, radio frequency energy repeaters and transponders have a wide variety of applications. One type of radio frequency energy repeater is a retro-directive repeater where a retro-directive antenna array in combination with other elements may be used, either with or without amplification, to return received electromagnetic energy to a transmitting source. For example, the well known "Van Atta" array, in which pairs of antenna elements are connected together by transmission lines of appropriate lengths, has an inherent ability to "retro-direct" received electromagnetic energy back to the source of such energy.

Another type of retro-directive system is described in U.S. Pat. No. 3,715,749, issued Feb. 6, 1973, entitled "Multi-Beam Radio Frequency System" inventor Donald H. Archer, and assigned to the same assignee as the present invention. Here, a pair of radio frequency multi-beam array antennas are connected together to provide a system which may operate in either an active mode or a passive mode, which may be operated selectively to respond to predetermined ones of spatially separated interrogating sources, and which may be equally and simultaneously responsive to interrogating signals from any one of a number of directions.

SUMMARY OF THE INVENTION

In accordance with the present invention, a system is provided for use in a radio frequency transponder/repeater wherein an array of receiving antenna elements is coupled to an array of transmitting antenna elements to provide an antenna system and including additionally an internal radio frequency source which is also coupled to the array of transmitting antenna elements. With such arrangement, an internally generated signal provided by the radio frequency source may be transmitted using the transmitting array of the Van Atta System.

BRIEF DESCRIPTION OF THE DRAWINGS

The above description aspects and other features of the invention are explained more fully in the following description taken in connection with the accompanying drawings in which.

DESCRIPTION OF THE PREFERRED EMBODIMENTS

Figure 1:
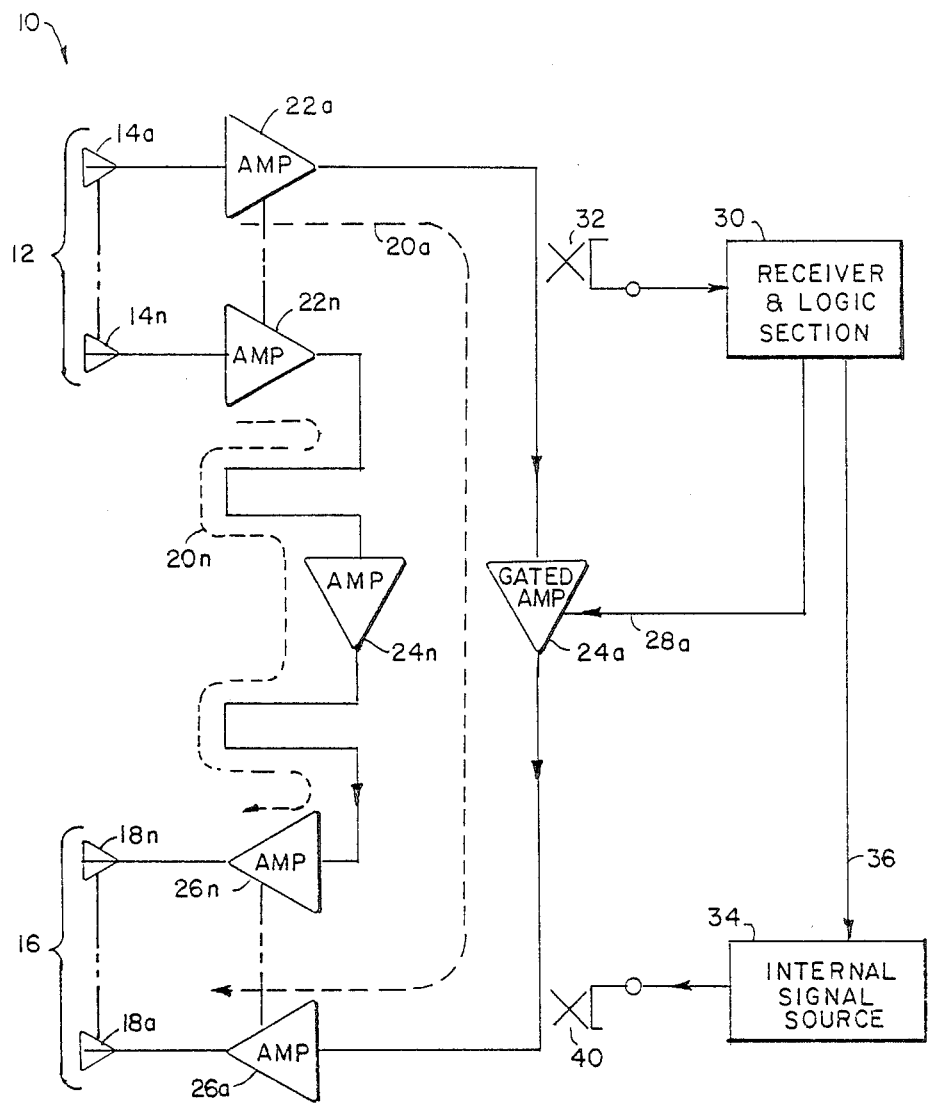
FIG. 1 is a block diagram of a radio frequency repeater/transponder according to the invention.

Referring now to FIG. 1, a radio frequency repeater/transponder 10 is shown to include a linear array 12 of receiving antenna elements 14a-14n coupled to a linear array 16 of transmitting antenna elements 18a-18n through electrical paths 20a-20n of equal electrical lengths. Disposed in each of the electrical paths are three serially coupled amplifiers 22a, 24a, and 26a through 22n, 24n, and 26n, respectively, as shown. Amplifier 24a is here a gated amplifier for reasons to be described hereinafter. Thus, when gated amplifier is enabled by a control signal fed thereto on line 28, the arrays 12, 16 and amplifiers 22a-22n, 24a-24n and 26a-26n are arranged as a conventional Van Atta antenna system having the inherent ability to "retro-direct" received electromagnetic energy from a soruce within the beam, or radiation antenna pattern, of the array 12; here, after the received energy has been amplified by amplifiers 22a-22n, 24a-24n, and 26a-26n.

Here the radio frequency repeater/transponder 10 is also adapted to receive energy from a second source outside of the relatively narrow beam, or radiation antenna pattern provided by array 12, but within a broader beam, or radiation antenna pattern provided by a single one of, or more generally, a portion of, the antenna elements 14a-14n in array 12 and retro-direct such energy back to the second source. For example, here a selected one of the receiving antenna elements 14a-14n, here antenna element 14a is coupled through amplifier 22a to both gated amplifier 24a and a receiver and logic section 30 via a directional coupler 32, as shown. An internal signal source 34, activated by receiver and logic section 30 via line 36, and the output of gated amplifier 24a are coupled to transmitting antenna element 18a through amplifier 26a via a directional coupler 40, as shown. Thus, it is noted that when internal source 34 is not activated by the receiver and logic section 30, energy received from the second source, i.e., a source outside of the narrower beam of array 12, but within the broader beam of single element 14a is retro-directed back to the second source because of the relatively broader beam portion of single transmitting antenna element 18a (as compared with the narrower beam of array 16). Further, it is noted that when energy from this second source is coupled to receiver and logic section 30 via directional coupler 32, such section 30 determines, in response to the detection of such signal and in accordance with any predetermined criterion stored in the logic of such section 30, whether to activate internal source 34 and thereby either: super-impose information in such source 34 onto the received signal (as when gated amplifier 24a is enabled by a control signal on line 28a); or merely transmit to the second source the information in source 34 (as when gated amplified 24a is disabled by the control signal on line 28). Thus, with the arrangement shown in FIG. 1, the repeater/transponder may be configured as a retro-directive repeater and/or a broad beam transponder, both of which have a common receiving antenna array 12 and a common transmitting array 16.

Figure 2:
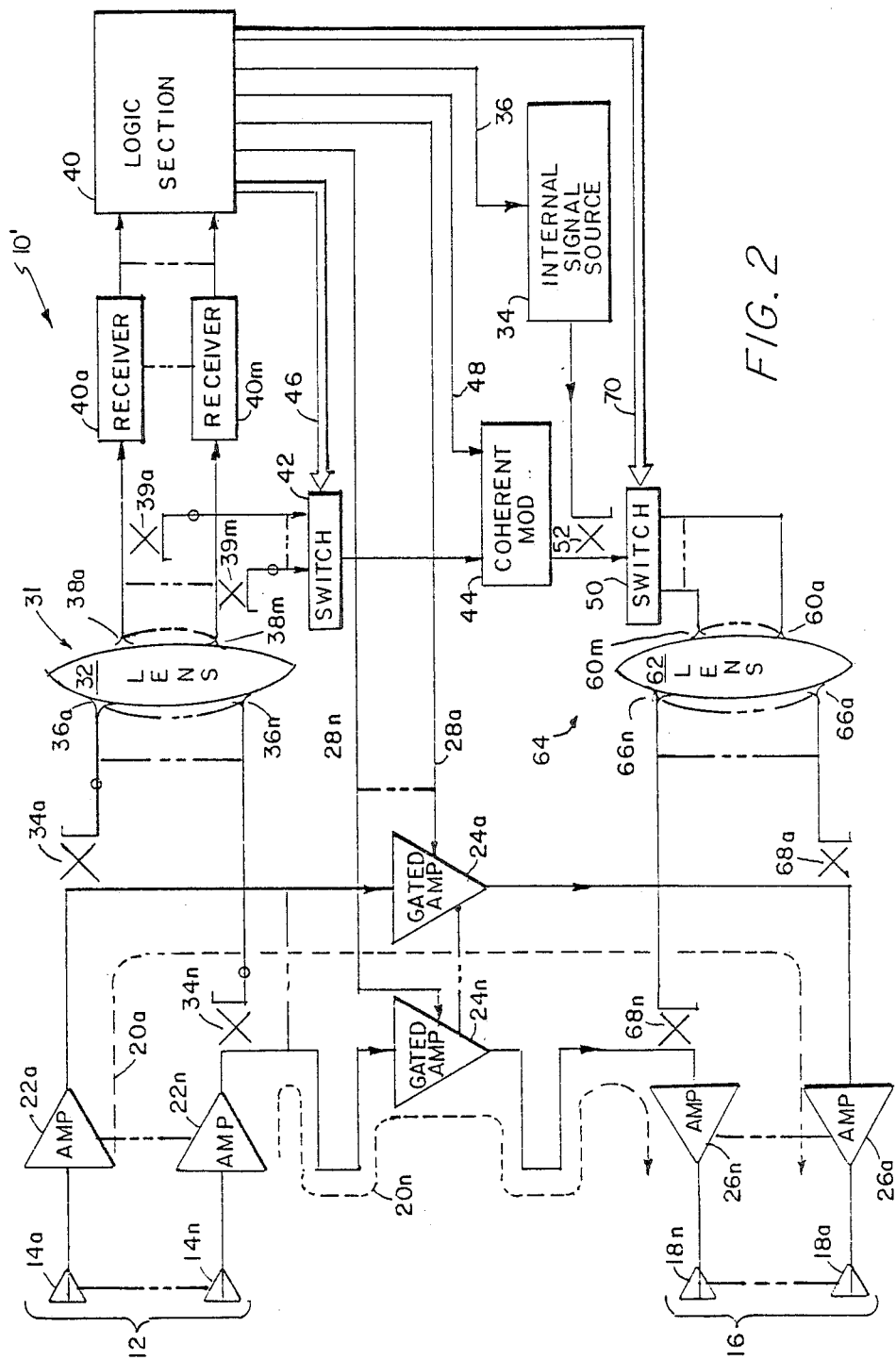
FIG. 2 is a block diagram of a radio frequency repeater/transponder according to an alternative embodiment of the invention.

Referring now to FIG. 2, a radio frequency repeater/transponder 10' is shown to also include a linear array 12 of receiving antenna elements 14a-14n coupled to a linear array 16 of transmitting antenna elements 18a-18n through paths 20a-20n of equal electrical lengths with serially coupled amplifiers 22a, 24a, 26a through 22n, 24n, 26n disposed in such paths 20a-20n, respectively, as shown to again provide a Van Atta antenna system, as described above in connection with FIG. 1. Here, however, the amplifiers 24a-24n are all gated amplifiers. Further, here the outputs of amplifiers 22a–22n are coupled to a beam forming network 31, here a multi-beam lens 32 of the type described in the above-referenced U.S. Pat. No. 3,715,749, adapted to provide a plurality of, here m, simultaneous existing antenna patterns, or beams, as well as to the inputs of gated amplifiers 24a–24n via directional couplers 34a–34n, as shown. Thus, as described in such U.S. Pat. No. 3,715,749, the linear array 12 of receiving antenna elements 14a–14n, the electrical lengths from such antenna elements 14a–14n to array ports 36a–36n, and the configuration of lens 32 is such that the electrical lengths of the paths from any one of the m feed ports, 38a–38m, to points along a planar wavefront of radio frequency energy in any one of the m beams thereof are the same. That is, the length of the electrical path from any one of the m feed ports 38a–38m to the planar wavefront of a corresponding one of the m beams is the same for radio frequency energy entering any one of the antenna elements 14a–14n. Thus, the energy from each of the m beams may be considered as being "focussed" to a corresponding one of the m feed ports 38a–38m. Thus, it follows that the beam forming network 31 is adapted to provide a direction finder, and by measuring the relative amount of energy received at the feed ports 38a–38m the direction, or angle of arrival of, a source of radio frequency energy may be determined. Thus, here a portion of the energy received at each one of the feed ports 38a–38m is coupled via directional couplers 39a–39m, to a corresponding one of a plurality of receivers 40a–40m, respectively, as shown. The outputs of the receivers 40a–40m are coupled to a logic section 40, as shown, and the remaining portions of the signals at feed ports 38a–38m are coupled to a switch 42; a selected one of such feed ports 38a–38m being coupled to a coherent modulator/source 44, such one of the feed ports 38a–38m so coupled being in accordance with control signal fed to such switch 42 via bus 46. Thus, here receivers 40a–40m and logic section 40 are used to, inter alia, determine which one of the feed ports 38a–38n received the signal from the source and, in response to such determination, couples the output of such one of the feed ports 38a–38m through switch 42 to the coherent modulator 44.

The coherent modulator 44 is activated by a control signal fed thereto from logic section 40 via control line 48. The coherent modulator 44 is adapted to either allow the signal fed thereto from switch 42 to pass to the output of the coherent modulator/source either modulated or unmodulated. The output of coherent modulator 44 is fed to the input of a switch 50 along with the output of an internal source 34 via a directional coupler 52, as shown. Internal source 34 is equivalent to that described above in connections with FIG. 1, and is thus activated by a control signal on line 36, here supplied by logic section 40.

The signal fed to the input of switch 50, which may be either the second signal modulated, the second signal unmodulated, or the internally generated signal (which may be superimposed onto the modulated received signal or the received unmodulated signal) is coupled to a selected one of m feed ports 60a–60m of multi-beam lens 62 of a beam forming network 64. The array ports 66a–66n are coupled to the inputs of amplifiers 26a–26n, respectively, along with the outputs of gated amplifiers 24a–24n, respectively, through directional couplers 68a–68n, respectively, as shown. Beam forming network 64 is configured to provide m simultaneously existing beams from transmitting array 16. That is, just as beam forming network 30 produces m simultaneously existing, differently directed beams from a common linear array 12 of receiving antenna element 14a–14n, beam forming network 64 produces m simultaneously existing, different directed beams from a common linear array 14 of transmitting antenna elements. It is noted that each one of the m receiving beams has the same direction of one of the m transmitting beams, and more particularly, the beams focussed to feed ports 38a–38m have the same directions as the beams produced by energy at feed ports 60m–60a, respectively. That is, for example, the one of the m received beams focussed to feed port 38a has the same direction as the one of the beams produced by feeding energy to feed port 60m, as described in the above-referenced U.S. Pat. No. 3,715,749. Thus, for example, if it is desired to retransmit received energy back to the source but modulated, or superimposed with internal source information, switch 50 is activated by control signals on bus 70 from logic section 40 to couple the signal fed to switch 50 to the corresponding one of the feed ports 60a–60m associated with a beam having the same direction as the source. Alternatively, switch 50 may be activated by control signals to transmit the signal at the input to switch 50 to a different direction and hence would couple such signal to a non-corresponding one of the feed ports 60a–60n. In any event, it is noted that both the retro-directive Van Atta system and the multi-beam system are a common receiving array 12 of receiving antenna elements 14a–14n, and a common transmitting array 16 of transmitting antenna elements 18a–18n. Thus, system 10' may be configured as a retro-directive repeater and/or a directional beam transponder, or a coherent transponder source having common transmit and receive antenna arrays 12, 16.

The flexibility of the disclosed systems will now become immediately apparent to one of skill in the art. Thus, for example, while a retro-directive antenna system is shown where energy is directed back towards the source, in other applications the energy may be directed to a separate station. Further, it is now apparent that the system in FIG. 2, for example, may be modified so that the lenses 32, 62 are coupled to only a portion of the antenna elements 14a–14n, 18a–18n as when the particular beam pattern desired for the internal source 34 is to be different from the beam pattern of the entire arrays 12, 16. If it is desired to increase the beam width during reception, for example, the number of input array ports 36a–36n coupled to array 12 can be reduced by using gated amplifiers for amplifiers 22a–22n are enabling a portion of such input gated amplifiers. Likewise for transmission, a wide or broader beam may be generated by using gated amplifiers for amplifiers 26a–26n and disabling a portion of such gated amplifiers, and when narrow beams are desired for both receive and transmit, common gating signals may be fed to these gated amplifiers. It is felt, therefore, that this invention should not be restricted to its disclosed embodiments, but rather should be limited only by the spirit and scope of the appended claims.

What is claimed is:

1. A radio frequency antenna system, comprising:
    (a) an antenna system having an array of transmitting antenna elements and an array of receiving antenna elements, corresponding individual transmitting antenna elements being coupled to corresponding individual receiving antenna elements through a set of electrically isolated electrical paths;

(b) a beam forming network having a plurality of input ports and a plurality of output ports;

(c) means for coupling radio frequency energy to a selected one of the input ports; and (d) means for coupling the output ports of the beam forming network to the antenna elements in the transmitting array of antenna elements.

2. The radio frequency antenna system of claim 1 wherein the array of transmitting antenna elements comprises a predetermined number of antenna elements, said portion of the antenna elements in the transmitting array of antenna elements comprising less than said predetermined number of antenna elements.

3. The radio frequency antenna system recited in claim 1 wherein the beam forming network comprises a radio frequency lens.

4. A radio frequency system comprising:

(a) a retro-directive antenna array system comprising an array of transmitting antenna elements, corresponding individual ones of said transmitting antenna elements being coupled to corresponding individual antenna elements of an array of receiving antenna elements through separate electrical paths having equal electrical lengths;

(b) radio frequency energy source means for producing a radio frequency signal; and (c) means, responsive to a radio frequency signal received by a first one of the array of receiving antenna elements, for either: (1) coupling the received radio frequency signal to a first one of the array of transmitting antenna elements corresponding to the first receiving antenna element and decoupling the radio frequency signal produced by the radio frequency source means from the first transmitting antenna element; or (2) decoupling the received radio frequency signal from the first transmitting antenna element and coupling the produced radio frequency signal to the first transmitting antenna element; or (3) coupling the received radio frequency signal and the produced radio frequency signal to the first transmitting antenna element.

5. The radio frequency antenna recited in claim 4 including: a first radio frequency lens having a plurality of array ports coupled to the array of receiving antenna elements; a receiver section coupled to a plurality of feed ports of the first radio frequency lens; a second radio frequency lens having a plurality of array ports coupled to the transmitting array of antenna elements; switch means coupled between the plurality of feed ports of the first radio frequency lens and a plurality of feed ports of the second radio frequency lens; and wherein the receiver section includes means for producing a control signal for the switch means, said switch means coupling a selected one of the plurality of feed ports of the first radio frequency lens to a selected one of the plurality of feed ports of the second radio frequency lens in accordance with said control signal.

6. The radio frequency system recited in claim 4 wherein said coupling said decoupling means comprises switching means, disposed in the one of the separate electrical paths coupled between the first receiving antenna element and the first transmitting antenna element, for opening or closing said one of the separate electrical paths selectively in response to a control signal.

7. A radio frequency antenna system comprising:

(a) an array of transmitting antenna elements;

(b) an array of receiving antenna elements;

(c) a set of electrically isolated radio frequency paths, each one of said paths being coupled between an individual antenna element of the array of receiving antenna elements and a corresponding individual antenna element of the array of transmitting antenna elements; and (d) a source of radio frequency energy;

(e) a beam forming network having a plurality of input ports and a plurality of output ports;

(f) means for coupling the source of radio frequency energy to a selected one of the input ports; and (g) means for coupling the output ports of the beam forming network to the antenna element of the array of transmitting antenna elements.

8. The radio frequency antenna system recited in claim 7 wherein the beam forming network comprises a radio frequency lens.

9. A radio frequency antenna system comprising:

(a) a retro-directive antenna array system comprising an array of antenna element means for receiving radio frequency energy and an array of antenna element means for transmitting radio frequency energy, corresponding individual receiving antenna element means being coupled to corresponding individual transmitting antenna element means through a set of electrically isolated electrical paths;

(b) a first radio frequency lens having a plurality of array ports coupled to the array of receiving antenna element means;

(c) receiver means, coupled to a plurality of feed ports of the first radio frequency lens, for producing a plurality of control signals in response to radio frequency energy received by a portion of the array of receiving antenna element means;

(d) a second radio frequency lens having a plurality of array ports coupled to the array of transmitting antenna element means;

(e) means, responsive to a first one of the plurality of control signals, for coupling a selected one of the plurality of feed ports of the first radio frequency lens to a selected one of a plurality of feed ports of the second radio frequency lens; and (f) a radio frequency source, said coupling means further comprising means for coupling the radio frequency source to, or decoupling the radio frequency source from, the selected one of the feed ports of the second radio frequency lens selectively in response to a second one of the plurality of control signals.

10. A radio frequency antenna system comprising:

(a) a Van Atta retrodirective antenna system having a plurality of receiving antenna elements coupled to a plurality of transmitting antenna elements; and (b) a radio frequency lens having a plurality of output ports coupled to the plurality of transmitting antenna elements.

11. The radio frequency antenna system recited in claim 10 wherein the radio frequency lens includes a plurality of input ports including, additionally, means for coupling radio frequency signals to a one of the plurality of input ports.

* * * * *